US012195085B2

(12) United States Patent
Reiff et al.

(10) Patent No.: US 12,195,085 B2
(45) Date of Patent: Jan. 14, 2025

(54) ALIGNMENT LOCKING CAM (71) Applicant: RB Distribution, Inc., Colmar, PA (US)

(72) Inventors: Thomas Reiff, Portage, MI (US); David Peter Cimbolo, Lake Harmony, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/194,938

(22) Filed: Apr. 3, 2023

(65) Prior Publication Data

US 2024/0326914 A1 Oct. 3, 2024

(51) Int. Cl.
*B62D 17/00* (2006.01)
*F16B 39/24* (2006.01)

(52) U.S. Cl.
CPC .............. *B62D 17/00* (2013.01); *F16B 39/24* (2013.01)

(58) Field of Classification Search
CPC ................................. F16B 39/24; B62D 17/00
See application file for complete search history.

(56) References Cited

U.S. PATENT DOCUMENTS

| | | | | |
|---|---|---|---|---|
| 2,525,217 A | * | 10/1950 | Glitsch | F16B 5/0642 261/114.5 |
| D243,714 S | | 3/1977 | Younger | |
| 5,129,669 A | * | 7/1992 | Specktor | B60G 11/28 280/86.753 |
| 5,775,719 A | * | 7/1998 | Holden | B62D 17/00 280/86.75 |
| 6,350,094 B1 | * | 2/2002 | Shiokawa | F16B 39/04 411/953 |
| D472,190 S | | 3/2003 | McCoy et al. | |
| 6,659,479 B1 | * | 12/2003 | Raidel, II | B60G 7/02 280/124.16 |
| 6,732,982 B1 | * | 5/2004 | Messinger | F16L 55/035 248/74.1 |
| 6,908,254 B2 | * | 6/2005 | Atwater | F16B 5/0225 411/169 |
| 7,125,026 B2 | * | 10/2006 | Genick, II | F16B 35/041 280/86.753 |
| D544,032 S | | 6/2007 | Shimada et al. | |
| D556,842 S | | 12/2007 | Webber | |
| 7,370,868 B2 | * | 5/2008 | Genick, II | F16B 35/041 280/86.753 |
| 7,661,916 B2 | | 2/2010 | Downey | |
| 7,857,565 B2 | * | 12/2010 | Martinson | F16B 5/0225 411/533 |
| 7,891,679 B2 | | 2/2011 | Svartz et al. | |
| D697,574 S | | 1/2014 | McPherson | |

(Continued)

FOREIGN PATENT DOCUMENTS

| | | | | |
|---|---|---|---|---|
| CA | 2774711 A1 | * | 6/2011 | ........... E04B 1/4121 |
| EP | 1467135 A1 | * | 10/2004 | ........... F16L 3/1233 |

(Continued)

*Primary Examiner* — Nicole T Verley
(74) *Attorney, Agent, or Firm* — Volpe Koenig (57) ABSTRACT

A locking cam for securing suspension components in a vehicle. The locking cam has at least one surface that is textured to create a surface for engagement against and with a frame member upon tightening of the suspension components. The textured surface can have ridges or projects for engagement with the frame member.

12 Claims, 7 Drawing Sheets

(56) References Cited

U.S. PATENT DOCUMENTS

| | | | |
|---|---|---|---|
| D755,683 S | 5/2016 | Goodlow | |
| D842,258 S | 3/2019 | Somers | |
| 10,940,731 B2 * | 3/2021 | Tiramani | ............. B62D 23/005 |
| 11,584,160 B2 * | 2/2023 | Wharram | ................ B60B 23/10 |
| D1,004,657 S | 11/2023 | Verbowski | |
| D1,010,502 S | 1/2024 | Hatcher | |
| 2002/0015628 A1 * | 2/2002 | Hartmann | ............... F16B 43/00 |
| | | | 411/161 |
| 2012/0104713 A1 * | 5/2012 | Frens | .................... B60G 7/003 |
| | | | 280/86.75 |
| 2017/0231797 A1 | 8/2017 | LeCursi et al. | |
| 2018/0127028 A1 * | 5/2018 | McIntyre | ................ F16B 39/24 |
| 2021/0276386 A1 | 9/2021 | Verbowski | |

FOREIGN PATENT DOCUMENTS

| | | | | |
|---|---|---|---|---|
| EP | 4286247 A1 * | 12/2023 | ............. | B60K 7/00 |
| IT | 202100019331 A1 * | 1/2023 | | |
| JP | 2021127789 A * | 9/2021 | | |
| WO | WO-2010006363 A1 * | 1/2010 | ............. | E04B 1/043 |

* cited by examiner

ALIGNMENT LOCKING CAM

FIELD OF INVENTION

The present disclosure is generally related to the technical field of vehicle suspension components. More particularly, the disclosure relates to present to the field of aligning suspension components. Most particularly, the disclosure relates to a locking cam for securing the alignment adjustments in a vehicle.

BACKGROUND

Adjusting cams are often used in automotive vehicle suspensions to provide adjustment between respective suspension components associated with wheel alignment. In various vehicles, such cams are used to adjust one or more of camber, caster, and/or toe angles in the vehicle.

Typically, the system includes a bolt, at least one adjusting cam, and a nut that secured the bolt in the desired position. The bolt is received through slotted holes in a frame component of the vehicle. In some systems there is a first adjusting cam fixed for rotation with the bolt adjacent the bolt head, and a second adjusting cam fixed for rotation with the bolt near the nut. Because the bolt and the cam surfaces are eccentrically arranged, rotation of the bolt adjusts a position of a longitudinal axis of the bolt within the slotted holes of the frame member. Accordingly, positional adjustment of a control arm or other suspension component secured to the frame member by the bolt can be made by rotating the bolt. Once a desired position of the suspension component is achieved, the nut is then tightened to secure the bolt in position.

Maintaining a properly tightened bolt arrangement is required to maintain a set position of the suspension component under vehicle usage. Under some conditions, such a vehicle wheel strikes a curb or pothole, or during off-road driving, slippage within the slotted holes can cause the suspension component to be moved from the desired position and, consequently, the vehicle can go out of alignment.

While conventional adjusting cams can offer satisfactory performance under most normal operating conditions, there is still a need for improved adjusting cams that are more resistant to slipping.

SUMMARY

The present solution to the prior art problem provides a locking cam with a non-planar that is textured to form a gripping surface that abuts against a vehicle frame member and locks the alignment bolt in place.

BRIEF DESCRIPTION OF THE DRAWINGS

The Detailed Description will be better understood when read in conjunction with the appended drawings in which.

DETAILED DESCRIPTION

Reference will now be made to the drawings wherein like reference numerals identify the same or similar features of a preferred locking cam.

Figure 1:
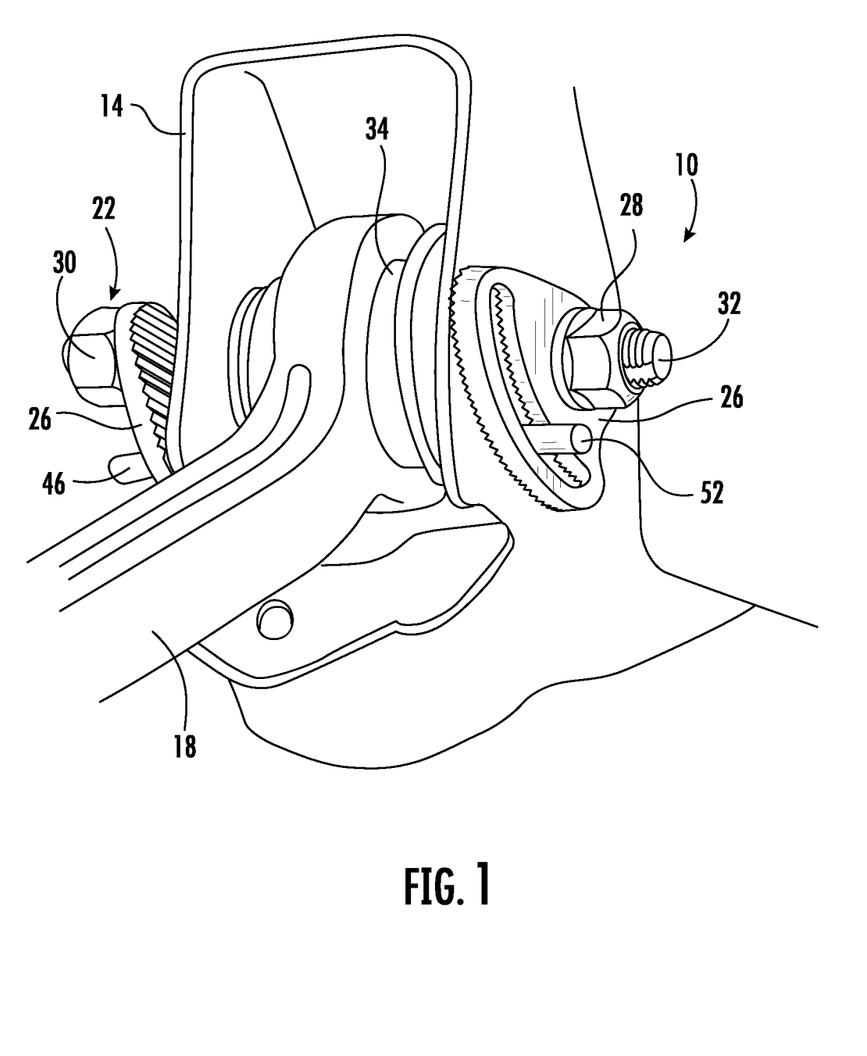
FIG. 1 is a perspective view of an exemplary vehicle suspension with the locking cam of the present invention.

For purposes of illustration, and not by way of a limitation, an exemplary suspension is shown in FIG. 1 and designated by the reference character 10. The illustrated assembly includes a vehicle frame member 14, a control arm 18, and a bushing 34.

The adjustment components of the assembly 10 generally include a bolt 22, first and second adjustment cams 26, and a nut 28. The bolt 22 includes a head 30 and a shank 32 that is received through the bushing 34 of the control arm 18 and the vehicle frame member 14 in accordance with the application. Typically, the bolt 22 is rotated to adjust an alignment. Once the desired alignment is achieved, as indicated by the position of pin 52, the nut 28 is tightened against the locking cam 26 to secure the bolt 22 in position.

As shown, the preferred locking cam is formed of a suitable metal, such as steel or another metallic alloy, and is heat treated to a Rockwell Hardness greater than 30 HRC. The locking cam body 36 in FIGS. 2-4 includes a bolt hole 38 for receiving the shank 32 of the bolt 22. The bolt hole 26 and the shank 32 may be of different shapes depending upon the vehicle manufacturer and the vehicle type. In the illustrated application, the bolt hole has a non-circular cross-section configured to cooperate with a non-circular cross-sectional portion of the shank 32 of the bolt 22 as seen in FIG. 9.

Figure 2:
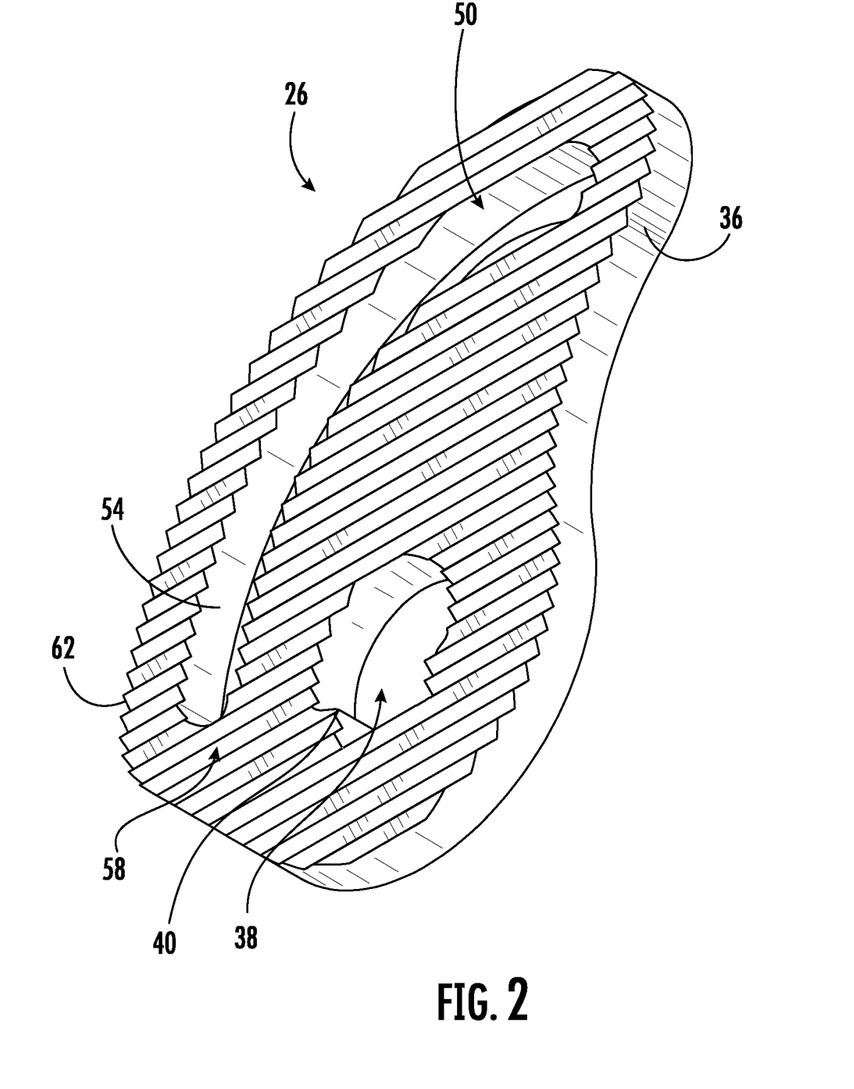
FIG. 2 is a perspective view of the engagement face of a preferred embodiment.
Figure 3:
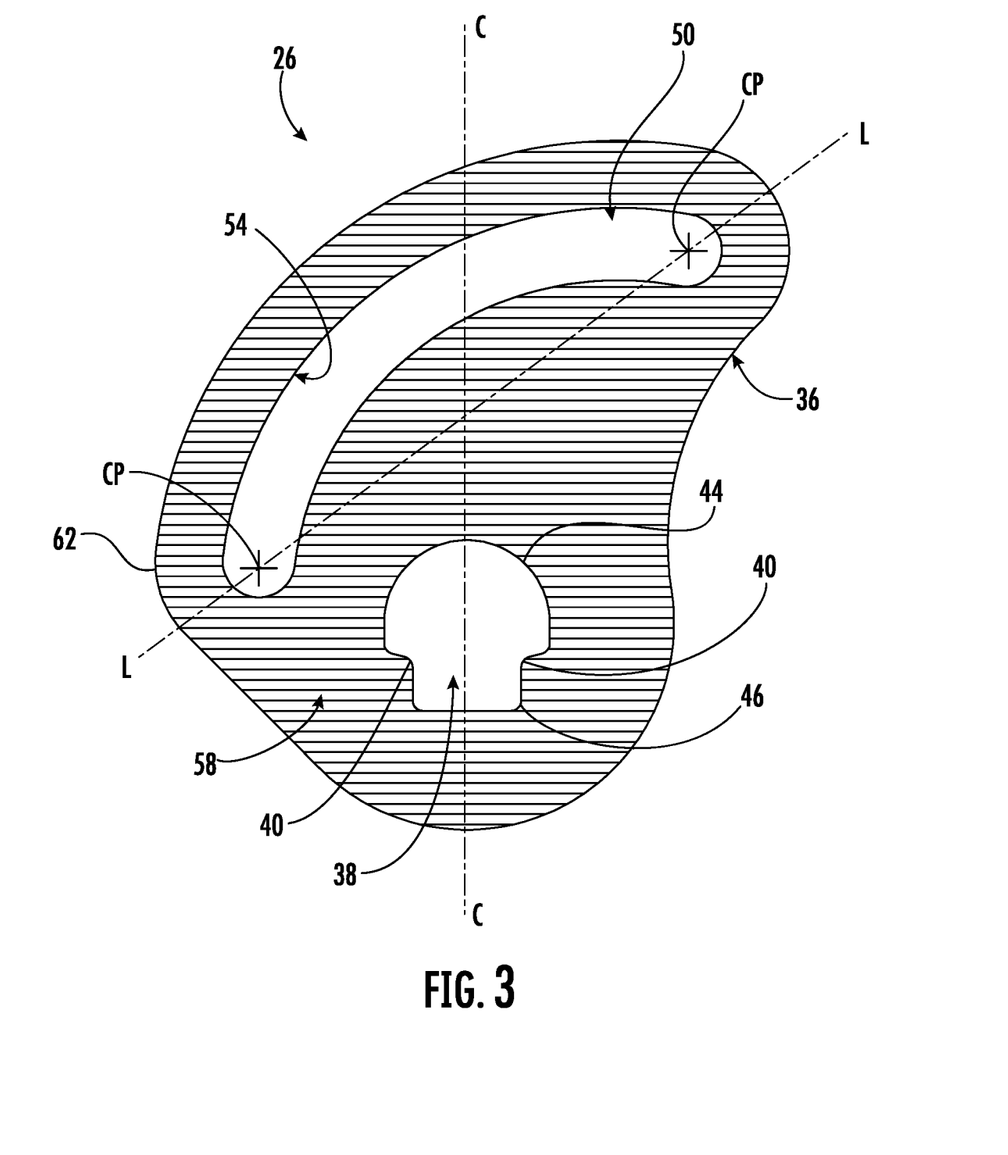
FIG. 3 is a plan view of a of the non-planar, engagement face in FIG. 2.
Figure 4:
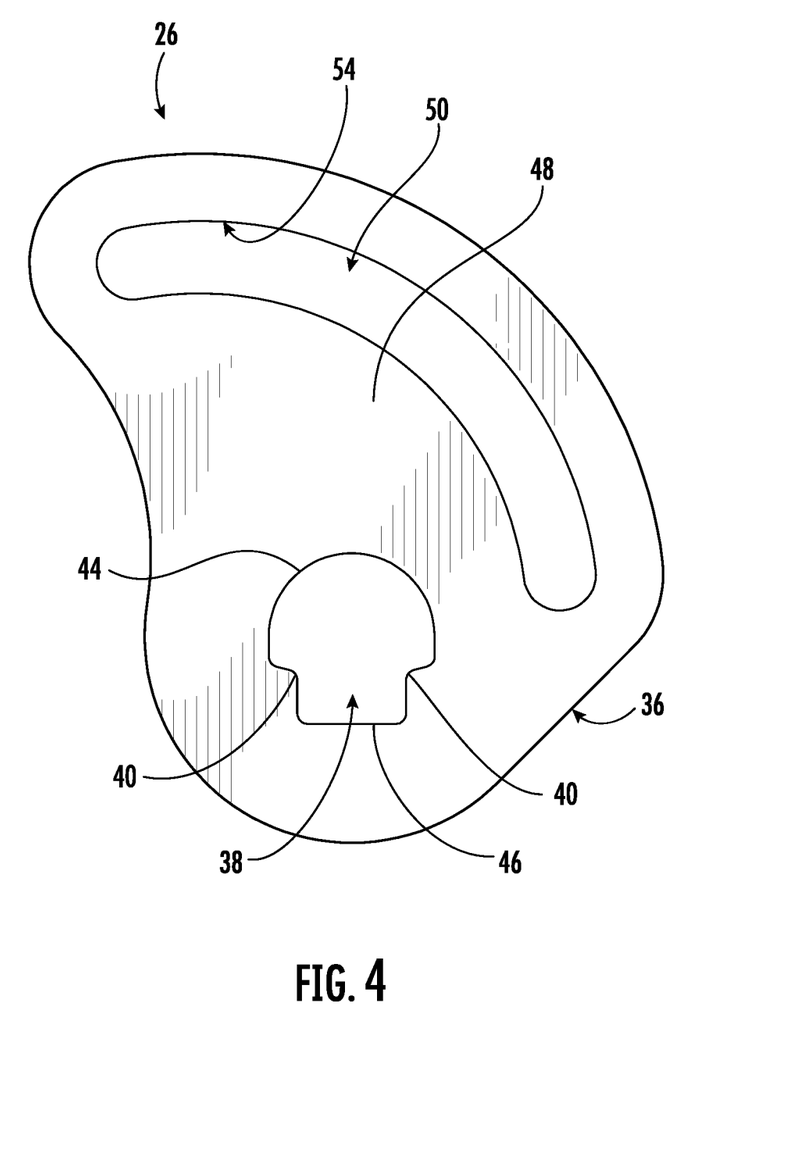
FIG. 4 is a plan view of the planar, non-engagement face of the preferred locking cam.

As illustrated in FIGS. 2 through 4, the bolt hole 38 has first and second shoulders 40 configured to be received in respective notches 42 spaced in the bolt 22. The bolt hole 38 has a round or dome portion 44 that connects with the shoulders 40 and a squared off portion 46 that is also connected with the shoulders 40.

As noted previously, the locking cam body 36 includes an arcuate lobe 48 that includes an arcuate slot 50 for receiving a pin 52, see FIG. 1, associated with the frame member 14. The arcuate slot 50 is configured to engage with and travel along a respective guide pin 52 to translate an alignment position when the bolt 22 is rotated clockwise or counterclockwise. When the desired position is located, the nut 28 is tightened against the locking cam 26 which grips the frame member 14 and secures the alignment as indicated by the pin 52.

With reference to FIGS. 2 and 3, the preferred locking cam body 36 includes a non-planar or textured face or surface 58 that is configured to engage with the frame member 14 and secure the alignment. In FIGS. 2 and 3, the illustrated textured surface 58 is comprised of a plurality of ridges or serrations 62 that project from the locking cam body 26 grip or bite into the frame member 14 when the nut 28 is tightened to lock the assembly 10.

In a preferred embodiment shown in FIG. 3, the ridges 62 are generally parallel to each other and aligned at approximately a 45-degree angle with a line L-L drawn between center points CP of terminal ends of the arcuate slot 50. The ridges 62 are generally perpendicular to a center line CL through the bolt hole 38. This orientation results in the ridges 62 being generally parallel to the squared off portion 46 of the bolt hole 38. As shown in FIG. 4, the non-engagement face 48 of the locking cam body 36 is generally planar or smooth.

Figure 5:
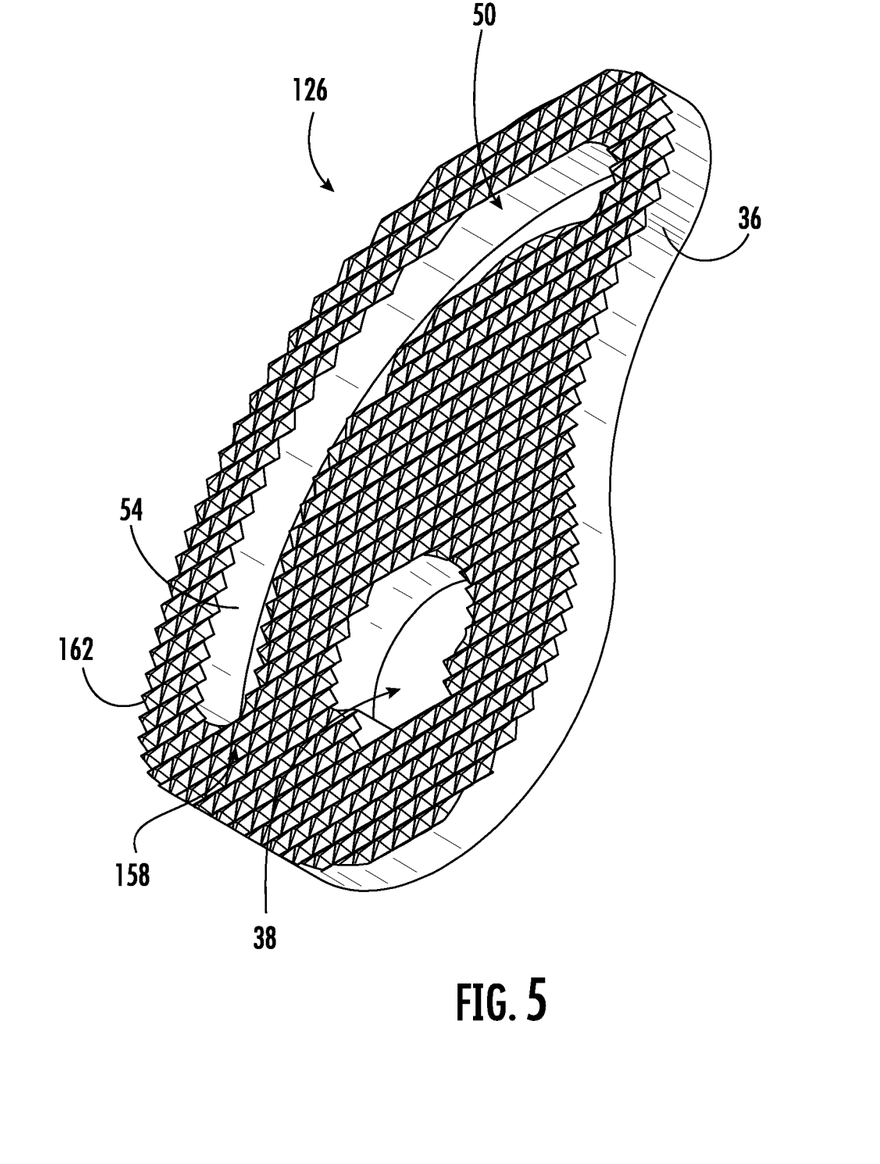
FIG. 5 is a perspective view of an alternative embodiment of the locking cam.

A typical original equipment manufacturer's specification for torqueing the alignment group after it is set is about 140 ft-lbs. This has been determined to be sufficient to engage the serrations with the vehicle frame FIG. 5 illustrates an alternative embodiment having a textured surface or engagement surface 158 which has projections forming a diamond pattern. In all other respects this embody is as described for the previous embodiment.

Figure 6:
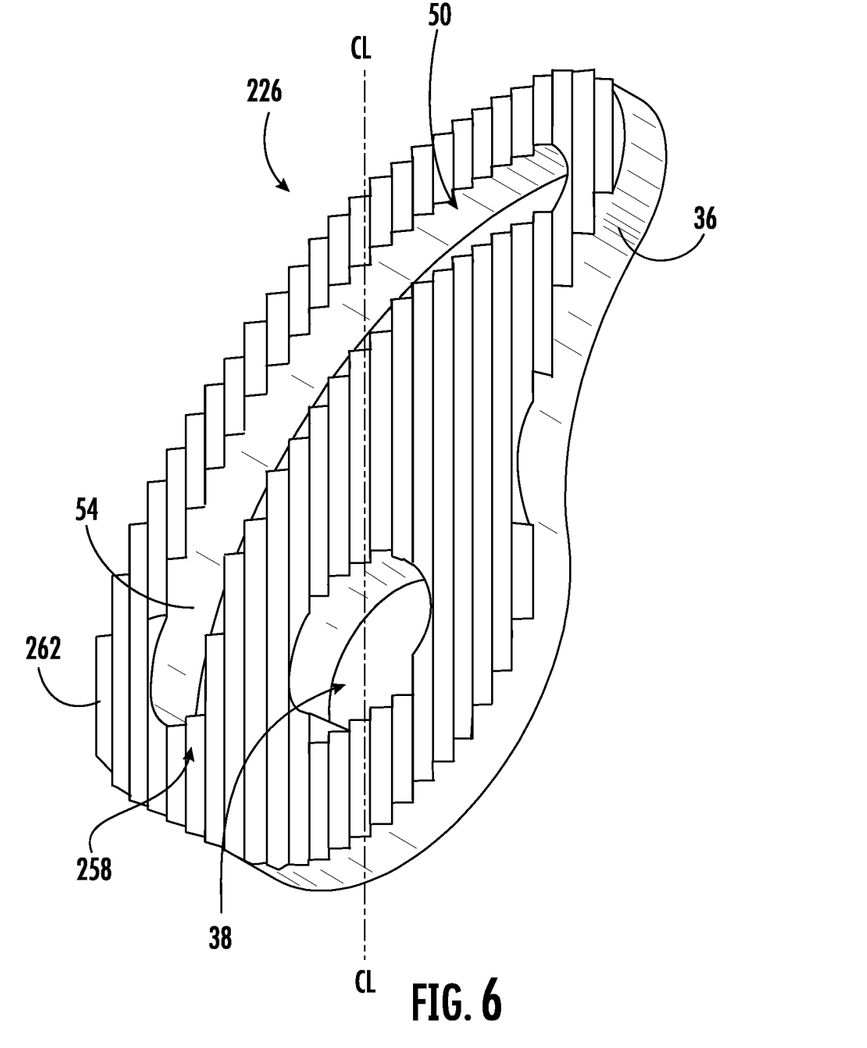
FIG. 6 is a perspective view of another alternative embodiment of the locking cam; and, FIG. 7 is a perspective view of an alignment kit that includes locking cams according to the preferred embodiment.

FIG. 6 illustrates another alternative embodiment that differs from the first described embodiment in tan the textured or engagement surface is comprised of ridges 262 that are aligned with a centerline CL through the bolt hole 38

Figure 7:
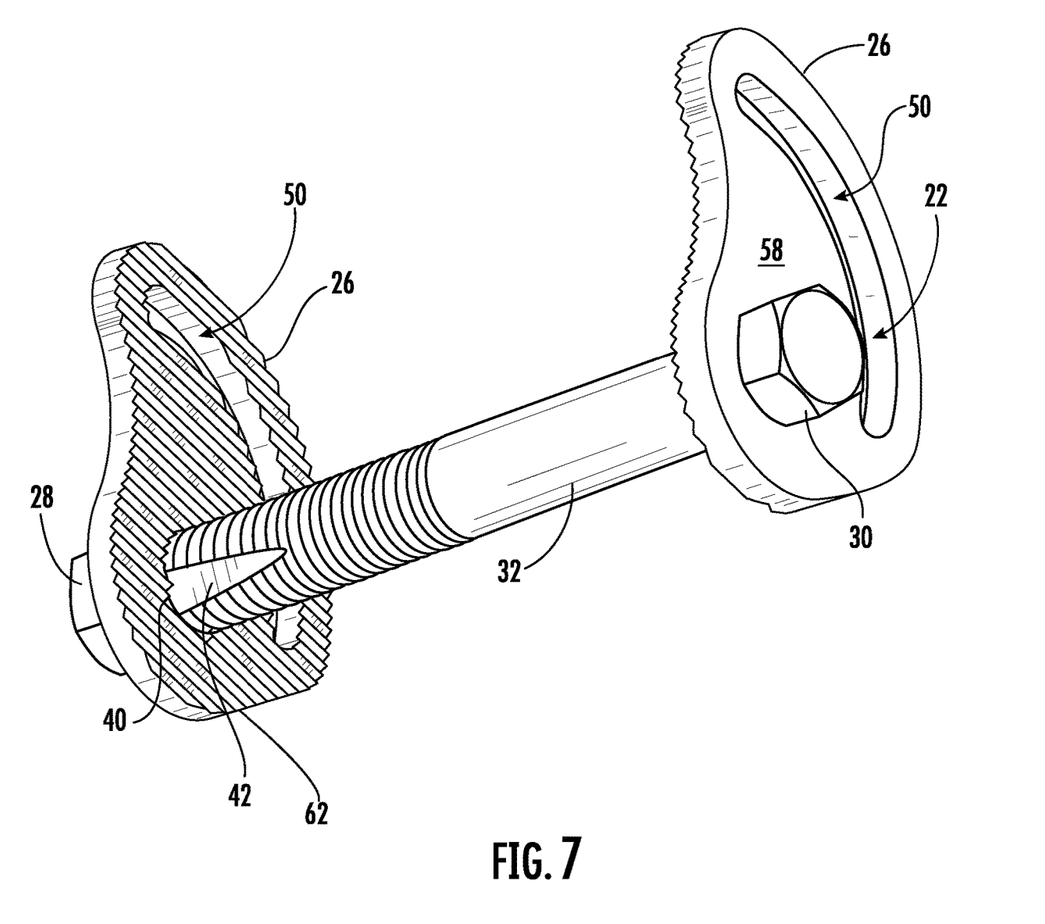

FIG. 7 illustrates the components for a locking kit 110. The kit 110 includes a bolt 122 and nut 128 selected according to the specific application and at least one locking cam 26, 126, or 226. As illustrated the kit 110 includes two locking cams. In some applications, a locking cam may be press fitted to the bolt, which will require the bolt hole 38 to be configured accordingly. In the illustrated kit 110, the bolt 32 is noted at 42 to fit within the hole 38 and engage the shoulders 40 so the bolt 32 and that the locking cam 26, 126, or 226 and the bolt 32 move as a unit.

What is claimed is:

1. An assembly for securing alignment of suspension component, the assembly comprising:
    a bolt having threaded end and a head configured to abut a suspension component at a send end;
    a nut configured to engage the threaded end of the bolt;
    at least one locking cam having a first surface that is planar and a second surface that is textured over substantially the entire second surface;
    wherein the at least one locking cam is positioned on the bolt so the textured second surface engages a suspension component upon tightening the bolt and nut together.

2. The assembly of claim 1, wherein the at least one cam has an arcuate slot for receiving an alignment pin associated with the suspension component.

3. The assembly of claim 1, wherein the second surface of the at least one locking cam has parallel ridges extending at an angle relative to a line between center points of opposite terminal ends of the arcuate slot.

4. The assembly of claim 3, wherein the angle is between 30 and 60 degrees.

5. The assembly of claim 1, wherein the locking cam is composed of a metal material having a Rockwell Hardness of at least 30.

6. A locking cam for securing an alignment of suspension components, the locking cam comprising:
    a cam body with opposed faces, a bolt hole, and an arcuate slot for receiving a pin associated with a vehicle frame;
    wherein at least one of the opposed faces of the cam body has a substantially textured locking surface.

7. The locking cam of claim 6, wherein the substantially textured surface includes a plurality of parallel ridges and the ridges are angled with respect to a line extending between center points of opposite terminal ends of the arcuate slot.

8. The locking cam of claim 7, wherein the at least two ridges among the plurality of ridges are angled by less than 60 degrees with respect to the line extending between center points.

9. The locking cam of claim 7, wherein the plurality of ridges are also parallel to a centerline through the bolt hole.

10. The locking cam of claim 6, wherein the substantially textured surface has a plurality of projections that extend outwardly.

11. The locking cam of claim 10 wherein the projections are diamond shaped.

12. The locking cam of claim 6, wherein the cam body is metallic with a Rockwell Hardness of at least 30.

\* \* \* \* \*